United States Patent
Wu et al.

(10) Patent No.: US 8,980,120 B2
(45) Date of Patent: Mar. 17, 2015

(54) HEAT DISSIPATING MATERIAL AND METHOD FOR PREPARING THE SAME

(71) Applicant: Getac Technology Corporation, Hsinchu County (TW)

(72) Inventors: Tien-Chieh Wu, Taipei (TW); Yen-Feng Shih, Taichung (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 13/939,132

(22) Filed: Jul. 10, 2013

(65) Prior Publication Data
US 2014/0070133 A1     Mar. 13, 2014

Related U.S. Application Data

(60) Provisional application No. 61/700,798, filed on Sep. 13, 2012.

(30) Foreign Application Priority Data

Oct. 16, 2012   (CN) .......................... 2012 1 0391147

(51) Int. Cl.
*H01M 10/653*   (2014.01)
*C09K 5/06*     (2006.01)

(52) U.S. Cl.
CPC ............. *H01M 10/504* (2013.01); *C09K 5/063* (2013.01)
USPC .......................................................... 252/74

(58) Field of Classification Search
CPC ........................................................ C09K 5/063
See application file for complete search history.

(56) References Cited

U.S. PATENT DOCUMENTS

2010/0208429 A1*  8/2010  Zhang et al. ................... 361/704
2013/0094207 A1*  4/2013  Negandhi et al. .............. 362/235

FOREIGN PATENT DOCUMENTS

TW           201202405 A       1/2012

* cited by examiner

*Primary Examiner* — Necholus Ogden, Jr.

(57) ABSTRACT

A heat dissipating material and a method for preparing the same, of which the method comprises the following steps: providing paraffin wax, boron nitride, graphite, and a modified multi-walled carbon nanotube; heating the paraffin wax until the paraffin wax is softened; and mixing the boron nitride, the graphite, the modified multi-walled carbon nanotube and the paraffin wax. Wherein, based on the total weight of the heat dissipating material, the content of the paraffin wax is from 50 to 60% by weight; the content of boron nitride is from 20 to 40% by weight; the content of the graphite is from 3 to 15% by weight; and the content of the modified multi-walled carbon nanotube is from 1 to 5% by weight.

11 Claims, 1 Drawing Sheet

S101 — Acidifying a multi-walled carbon nano-tube

S102 — Adding a long chain alkanol and a dehydrating agent to form an ester bonding between the multi-walled carbon nano-tube with a carboxylate group and the long chain alkanol

HEAT DISSIPATING MATERIAL AND METHOD FOR PREPARING THE SAME

BACKGROUND OF THE INVENTION

1. Field of the Invention

The present invention is related to a heat dissipating material and a method for preparing the same, and more particularly, to a heat dissipating material having boron nitride and the graphite mixed with the paraffin wax as well as a method for preparing the same.

2. Description of the Prior Art

Currently, the mainstream transportation is powered by the thermal energy released from the burning of petroleum fuels. However, the efficiency of converting thermal energy into kinetic energy is less than ideal due to the thermodynamic limitation. Since the conversion efficiency of electrical energy into kinetic energy is much more excellent than that of petroleum fuels into kinetic energy, therefore, a battery as a power source of transportation has been developed gradually.

However, the use of a single battery as a power source often encountered a problem of insufficient voltage. As a result, several batteries are often connected in series to form a battery pack that provides the required voltage. Since the battery pack includes a plurality of batteries, the working temperature of the battery pack at discharge was relatively increased, thus causing problems of decreased efficiency regarding energy conversion and shortening of battery life.

SUMMARY OF THE INVENTION

In one embodiment, a heat dissipating material disclosed comprises paraffin wax, boron nitride, graphite, and a modified multi-walled carbon nanotube. The content of the paraffin wax is from 50 to 60% by weight, based on the total weight of the heat dissipating material. The content of the boron nitride is from 20 to 40% by weight, based on the total weight of the heat dissipating material. The content of the graphite is from 3 to 15% by weight, based on the total weight of the heat dissipating material. The content of the modified multi-walled carbon nanotube is from 1 to 5% by weight, based on the total weight of the heat dissipating material, and the modified multi-walled carbon nanotube has a surface ester group (—COOR). Furthermore, the paraffin wax absorbs or releases heat through phase change, and the boron nitride and the graphite increase the thermal conductivity of the heat dissipating material.

In one embodiment, a method for preparing a heat dissipating material is disclosed, comprising the following steps: providing paraffin wax, boron nitride, graphite, and a modified multi-walled carbon nanotube, wherein the content of the boron nitride is from 20 to 40% by weight, based on the total weight of the heat dissipating material, the content of the graphite is from 3 to 15% by weight, based on the total weight of the heat dissipating material, the content of the modified multi-walled carbon nanotube is from 1 to 5% by weight, based on the total weight of the heat dissipating material, and the modified multi-walled carbon nanotube has a surface ester group (—COOR); heating the paraffin wax until the paraffin wax is solftened; and mixing the boron nitride, the graphite, the modified multi-walled carbon nanotube, and the paraffin wax.

In one embodiment, a heat dissipating material disclosed comprises paraffin wax, boron nitride, and graphite. The content of the paraffin wax is from 50 to 60% by weight, based on the total weight of the heat dissipating material. The content of the boron nitride is from 25 to 45% by weight, based on the total weight of the heat dissipating material. The content of the graphite is from 5 to 15% by weight, based on the total weight of the heat dissipating material. Furthermore, the paraffin wax absorbs or releases heat through phase change, and the boron nitride and the graphite increase the thermal conductivity of the heat dissipating material.

In one embodiment, a method for preparing a heat dissipating material is disclosed, comprising the following steps: providing paraffin wax, boron nitride, and graphite, wherein the content of the paraffin wax is from 50 to 60% by weight, based on the total weight of the heat dissipating material; the content of the boron nitride is from 25 to 45% by weight, based on the total weight of the heat dissipating material; the content of the graphite is from 5 to 15% by weight, based on the total weight of the heat dissipating material; heating the paraffin wax until the paraffin wax is softened; and mixing the boron nitride, the graphite, and the paraffin wax.

DETAILED DESCRIPTION OF THE EMBODIMENTS

Figure 1:
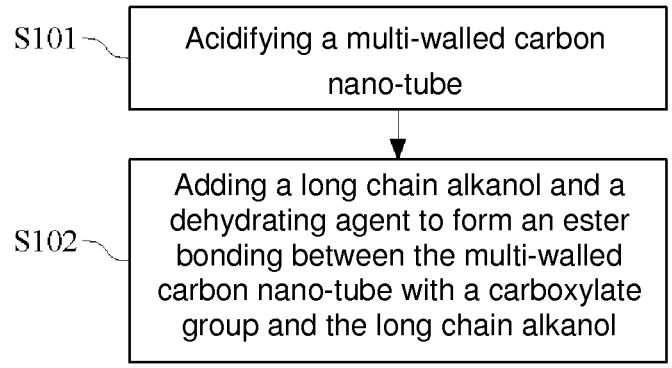
FIG. 1 is a flow chart showing a method for preparing a modified multi-walled carbon nanotube disclosed in one embodiment of the present invention.

Detailed features and advantages of the present invention will be set forth in the detailed description which follows, and will enable those skilled in the art to understand and practice the technical contents of the present invention. The following embodiments further illustrate aspects of the present invention and are not intended to limit the scope of the present invention in any way.

The heat dissipating material disclosed in one embodiment of the present invention comprises paraffin wax, boron nitride, graphite, and a modified multi-walled carbon nanotube. The content of the paraffin wax is from 50 to 60% by weight, based on the total weight of the heat dissipating material. The boron nitride is, for example but not limited to, hexagonal boron nitride. In other embodiments, the boron nitride can be trigonal boron nitride or cubic boron nitride. The content of the boron nitride is from 20 to 40% by weight, based on the total weight of the heat dissipating material. The content of the graphite is from 3 to 15% by weight, based on the total weight of the heat dissipating material. The modified multi-walled carbon nanotube is, but not limited to octadecanol-modified multi-walled carbon nanotube. The content of the modified multi-walled carbon nanotube is from 1 to 5% by weight, based on the total weight of the heat dissipating material, and the modified multi-walled carbon nanotube has a surface ester group (—COOR). It must be noted that the total content of the boron nitride, the graphite, and the carbon tube has to be less than 50% by weight, based on the total weight of the heat dissipating material. If the total content of the boron nitride, the graphite, and the carbon tube is more than 50% by weight of the total weight of the heat dissipating material, the resultant heat dissipating material obtained after mixing will crumble easily. Moreover, the paraffin wax absorbs or release heat through the phase change. The boron nitride and the graphite are used to increase the thermal conductivity of the heat dissipating material. The specifications of the various raw materials are listed in table 1.

TABLE 1 the specifications of the various raw materials

|  | Paraffin wax | Boron Nitride | Graphite | Multi-walled carbon nanotube |
|---|---|---|---|---|
| English name | Paraffin Wax | Boron Nitride | Graphite | Multi-walled carbon nanotube |
| CAS Number | 8002-74-2 | — | — | — |
| Melting point | 44-46° C. | — | — | — |
| Morphology | Cake | Powder, lamellar | Powder, lamellar | Powder, tubular and hollow |
| Purity | >95% | >99% | — | >95% |
| Density, g/ml | 0.90 | 0.44 (apparent density) | — | — |
| Mean particle size | — | 8 μm | — | — |
| Thermal conductivity | — | 300 W/m · K | — | — |
| Dielectric constant | — | 4 | — | — |
| Mean granularity | — | — | <50 mesh | — |
| Carbon content | — | — | >95% | — |
| Expansion ratio | — | — | >250 times | — |
| Mean tube diameter | — | — | — | 10~50 nm |
| Mean length | — | — | — | 1~25 μm |
| specific surface area, $m^2/g$ | — | — | — | 15~250 |

With reference to FIG. 1, which is a flow chart showing a method for preparing a modified multi-walled carbon nanotube disclosed in one embodiment of the present invention. The method for preparing a modified multi-walled carbon nanotube mentioned above may comprise the following steps: acidifying a multi-walled carbon nanotube for obtaining a carbon nanotube with a surface carboxylic acid functional group (—COOH) (S101); and then adding a long chain alkanol and using a dehydrating agent for dehydrating to form an ester bonding between the carbon tube and the long chain alkanol and thus obtaining the modified multi-walled carbon nanotube (S102).

In more detail, the mixed acid solution used in acidifying the multi-walled carbon nanotube was consisting of sulfuric acid and nitric acid with a volumetric ratio of 3:1. When the multi-walled carbon nanotube was put into the mixed acid solution, the surface of the multi-walled carbon nanotube would be oxidatively acidified. At the same time, the multi-walled carbon nanotube had a surface carboxylic acid functional group. In addition, when the multi-walled carbon nanotube was being acidified, the acid solutions mixed with the multi-walled carbon nanotube were stirred to increase the reaction rate of the acidification. It must be noted that the ingredients of the acid solution used above were not intended to limit the scope of the present invention. For example, the acid solution may be an inorganic strong acid, such as sulfuric acid and nitric acid, or a mixture of strong acids. On the other hand, the acid solution mixed with the multi-walled carbon nanotube may be stirred by other means, such as an ultrasonic device to stir the acid solution through ultrasonic oscillation.

In another aspect, when the esterification reaction was carried out between the multi-walled carbon nanotube and the long chain alkanol to form an ester bonding, the long chain alkanol used might be an alkanol having 12 to 30 carbon atoms, such as dodecanol, tetradecanol, hexadecanol, octadecanol, or eicosanol; preferably a long chain alkanol having 15 to 25 carbon atoms, such as hexadecanol or octadecanol; and more preferably a long chain alkanol having 16 to 20 carbon atoms, such as octadecanol. The long chain alkanol used in the present embodiment was octadecanol but not limited thereto. In addition, when the multi-walled carbon nanotube was dehydrated with octadecanol to form an ester bonding, the dehydrating agent used was, for example but not limiting to, imides. In the present embodiment and part of the other embodiments, the dehydrating agent was N,N'-dicyclohexylcarbodiimide.

The following detailed description relates to the steps of the esterification reaction between the multi-walled carbon nanotubes and the long chain alkanol to form an ester bonding. First, the multi-walled carbon nanotubes with carboxyl groups were dispersed in a container charged with dehydrated dimethylformamide, which might avoid affecting the reaction rate of the esterification reaction by water. Next, in order to make the multi-walled carbon nanotubes with carboxyl groups a limiting reagent, it was necessary to add excess octadecanol into the container. After the octadecanol was completely dissolved, excess N,N'-dicyclohexylcarbodiimide was added into the container. Afterwards, the reaction temperature of the mixed solution in the container was kept at room temperature. In the present embodiment, the reaction temperature was kept at room temperature by water bath but not limited thereto. After the carboxyl group was converted to an ester group (—COOR) by the esterification reaction between the multi-walled carbon nanotubes with the carboxyl group and the octadecanol, the octadecanol-modified multi-walled carbon nanotube was thus formed. After that, the octadecanol-modified multi-walled carbon nanotube was filtered by suction and then the resultant octadecanol-modified multi-walled carbon nanotube was washed by an organic solvent, such as dimethylformamide or hexane, to remove water. At last, the preparation of purified octadecanol-modified multi-walled carbon nanotubes was completed.

Figure 2:
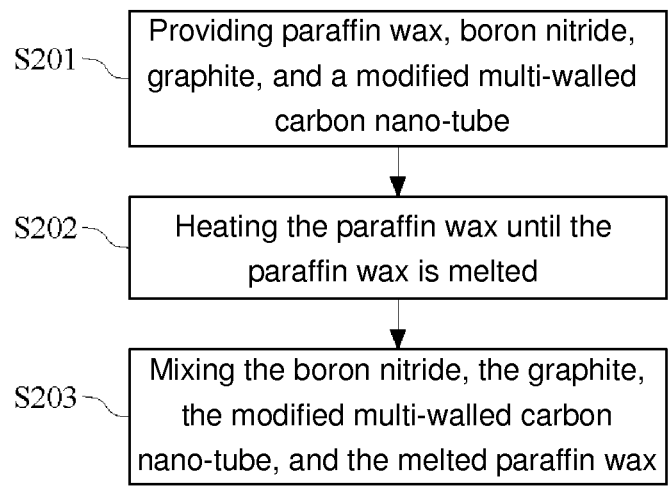
FIG. 2 is a flow chart showing a method for preparing a heat dissipating material disclosed in one embodiment of the present invention.

Reference is now made to FIG. 2, which is a flow chart showing a method for preparing a heat dissipating material disclosed in one embodiment of the present invention. The method for preparing a heat dissipating material provided by the present invention mainly comprised the following steps. The paraffin wax, boron nitride, the graphite, and the modified multi-walled carbon nanotubes described in the above embodiments were provided (S201). The paraffin wax was heated to be softened (S202). Boron nitride, the graphite, the modified multi-walled carbon nanotubes, and the paraffin wax were mixed (S203).

Embodiment 1

The heat dissipating material was made according to steps (S201), (S202), and (S203). As shown in tables 2 and 3 below, the content of the paraffin wax was 60% by weight, based on the total weight of the heat dissipating material; the content of boron nitride was 35% by weight, based on the total weight of the heat dissipating material; the content of the graphite was 3% by weight, based on the total weight of the heat dissipating material; and the content of the modified multi-walled carbon nanotubes with a surface ester group (—COOR) was 2% by weight, based on the total weight of the heat dissipating material. Furthermore, the mixing of the boron nitride, the graphite, the modified multi-walled carbon nanotube, and the paraffin wax was carried out by a stirring action with a stirring rate of 50 to 80 turns/min. at an ambient temperature of 30° C. to 40° C. for 5 to 10 minutes.

Next, the experimental tests were proceeded. First, the heat dissipating material was put in a constant temperature bath of 80° C. After the measurement, it was known that it needed 147 seconds for heating the heat dissipating material from 30° C. to 80° C. After that, the heat dissipating material was put in a constant temperature bath of 30° C. After the measurement, it was known that it needed 204 seconds for cooling the heat dissipating material from 80° C. to 30° C. The thermal conductivity coefficient of the heat dissipating material was 2.426 W/m·K. The surface resistivity of the heat dissipating material was $3.30 \times 10^8$ Ω/sq. At last, the heat dissipating material was filled in a battery pack. After the measurements, it was known that the mean temperature of the battery pack containing the heat dissipating material was 50.06° C. after discharging for 15 minutes. It took 358 seconds to heat the pure paraffin wax from 30° C. to 80° C. and 1534 seconds to cool the pure paraffin wax from 80° C. to 30° C. Therefore, the thermal conductive ability of the heat dissipation material was better than that of the pure paraffin wax. The mean temperature of the battery pack without the heat dissipating material was 61.40° C. after discharging for 15 minutes. Accordingly, the working temperature of the battery pack filled with the heat dissipating material was indeed lower.

Embodiment 2

The present embodiment was similar to Embodiment 1, except that the content of the paraffin wax was 60% by weight, based on the total weight of the heat dissipating material; the content of boron nitride was 20% by weight, based on the total weight of the heat dissipating material; the content of the graphite was 15% by weight, based on the total weight of the heat dissipating material; and the content of the modified multi-walled carbon nanotubes was 5% by weight, based on the total weight of the heat dissipating material. It took 125 seconds to heat the heat dissipating material of the present embodiment from 30° C. to 80° C. and 186 seconds to cool the heat dissipating material of the present embodiment from 80° C. to 30° C. The thermal conductivity coefficient of the heat dissipating material was 3.818 W/m·K. The surface resistivity of the heat dissipating material was $1.19 \times 10^6$ Ω/sq. The mean temperature of the battery pack containing the heat dissipating material was 48.67° C. after discharging for 15 minutes.

Embodiment 3

The present embodiment was similar to Embodiment 1, except that the content of the paraffin wax was 50% by weight, based on the total weight of the heat dissipating material; the content of boron nitride was 40% by weight, based on the total weight of the heat dissipating material; the content of the graphite was 9% by weight, based on the total weight of the heat dissipating material; and the content of the modified multi-walled carbon nanotubes was 1% by weight, based on the total weight of the heat dissipating material. It took 120 seconds to heat the heat dissipating material of the present embodiment from 30° C. to 80° C. and 178 seconds to cool the heat dissipating material of the present embodiment from 80° C. to 30° C. The thermal conductivity coefficient of the heat dissipating material was 4.010 W/m·K. The surface resistivity of the heat dissipating material was $2.64 \times 10^4$ Ω/sq. The mean temperature of the battery pack containing the heat dissipating material was 48.48° C. after discharging for 15 minutes.

Embodiment 4

The present embodiment was similar to Embodiment 1, except that the content of the paraffin wax was 50% by weight, based on the total weight of the heat dissipating material; the content of boron nitride was 40% by weight, based on the total weight of the heat dissipating material; the content of the graphite was 5% by weight, based on the total weight of the heat dissipating material; and the content of the modified multi-walled carbon nanotubes was 5% by weight, based on the total weight of the heat dissipating material. It took 94 seconds to heat the heat dissipating material of the present embodiment from 30° C. to 80° C. and 152 seconds to cool the heat dissipating material of the present embodiment from 80° C. to 30° C. The thermal conductivity coefficient of the heat dissipating material was 5.598 W/m·K. The surface resistivity of the heat dissipating material was $1.20 \times 10^4$ Ω/sq. The mean temperature of the battery pack containing the heat dissipating material was 46.89° C. after discharging for 15 minutes.

Embodiment 5

The present embodiment was similar to Embodiment 1, except that the content of the paraffin wax was 60% by weight, based on the total weight of the heat dissipating material; the content of boron nitride was 35% by weight, based on the total weight of the heat dissipating material; the content of the graphite was 4% by weight, based on the total weight of the heat dissipating material; and the content of the modified multi-walled carbon nanotubes was 1% by weight, based on the total weight of the heat dissipating material. It took 245 seconds to heat the heat dissipating material of the present embodiment from 30° C. to 80° C. and 832 seconds to cool the heat dissipating material of the present embodiment from 80° C. to 30° C. The thermal conductivity coefficient of the heat dissipating material was 1.457 W/m·K. The surface resistivity of the heat dissipating material was $3.16 \times 10^6$ Ω/sq. The mean temperature of the battery pack containing the heat dissipating material was 51.03° C. after discharging for 15 minutes.

Embodiment 6

The present embodiment was similar to Embodiment 1, except that the content of the paraffin wax was 60% by weight, based on the total weight of the heat dissipating material; the content of boron nitride was 25% by weight, based on the total weight of the heat dissipating material; the content of the graphite was 14% by weight, based on the total weight of the heat dissipating material; and the content of the modified multi-walled carbon nanotubes was 1% by weight, based on the total weight of the heat dissipating material. It took 136 seconds to heat the heat dissipating material of the present embodiment from 30° C. to 80° C. and 195 seconds to cool the heat dissipating material of the present embodiment from 80° C. to 30° C. The thermal conductivity coefficient of the heat dissipating material was 3.105 W/m·K. The surface resistivity of the heat dissipating material was $8.23 \times 10^6$ Ω/sq. The mean temperature of the battery pack containing the heat dissipating material was 49.38° C. after discharging for 15 minutes.

TABLE 2

| Embodi-ments | Paraffin wax (%) | Boron nitride (%) | Graphite (%) | Modified multi-walled carbon tube (%) |
|---|---|---|---|---|
| 1 | 60 | 35 | 3 | 2 |
| 2 | 60 | 20 | 15 | 5 |
| 3 | 50 | 40 | 9 | 1 |
| 4 | 50 | 40 | 5 | 5 |
| 5 | 60 | 35 | 4 | 1 |
| 6 | 60 | 25 | 14 | 1 |

TABLE 3

| Embodi-ments | Heating time required (sec.) | Cooling time required (sec.) | Thermal conductivity coefficient (W/m·K) | Surface resistivity (Ω/sq) | Temperature after discharging (° C.) |
|---|---|---|---|---|---|
| 1 | 147 | 204 | 2.426 | $3.30 \times 10^8$ | 50.06 |
| 2 | 125 | 186 | 3.818 | $1.19 \times 10^6$ | 48.67 |
| 3 | 120 | 178 | 4.010 | $2.64 \times 10^4$ | 48.48 |
| 4 | 94 | 152 | 5.598 | $1.20 \times 10^4$ | 46.89 |
| 5 | 245 | 832 | 1.457 | $3.16 \times 10^6$ | 51.03 |
| 6 | 136 | 195 | 3.105 | $8.23 \times 10^6$ | 49.38 |

In addition, a heat dissipating material disclosed in another embodiment of the present invention comprised the paraffin wax, boron nitride, and the graphite. The content of the paraffin wax was 50 to 60% by weight, based on the total weight of the heat dissipating material. The boron nitride is, for example but not limited to, hexagonal boron nitride. In other embodiments, the boron nitride can be trigonal boron nitride or cubic boron nitride. The content of the boron nitride is from 25 to 45% by weight, based on the total weight of the heat dissipating material. The content of the graphite is from 5 to 15% by weight, based on the total weight of the heat dissipating material. Furthermore, the paraffin wax absorbed or released heat through the phase change. The boron nitride and the graphite were used to increase the thermal conductivity of the heat dissipating material.

Figure 3:
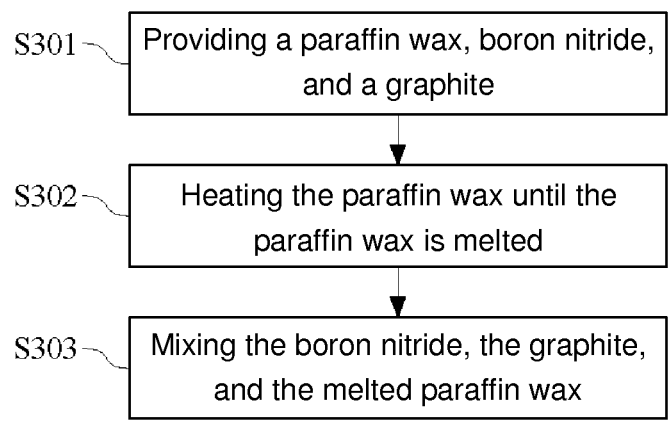
FIG. 3 is a flow chart showing a method for preparing a heat dissipating material disclosed in one embodiment of the present invention.

Reference is now made to FIG. 3, which is a flow chart showing a method for preparing a heat dissipating material disclosed in one embodiment of the present invention. The method for preparing a heat dissipating material provided by the present invention mainly comprised the following steps. The paraffin wax, boron nitride, and the graphite described in the above embodiments were provided (S301). The paraffin wax was heated to be softened (S302). Boron nitride, the graphite, and the paraffin wax were mixed (S303).

Embodiment 7

The heat dissipating material was made according to steps (S301), (S302), and (S303). As shown in tables 4 and 5 below, the content of the paraffin wax was 60% by weight, based on the total weight of the heat dissipating material; the content of boron nitride was 25% by weight, based on the total weight of the heat dissipating material; and the content of the graphite was 15% by weight, based on the total weight of the heat dissipating material. Furthermore, the mixing of the boron nitride, the graphite, and the paraffin wax was carried out by a stirring action with a stirring rate of 50 to 80 turns/min. at an ambient temperature of 30° C. to 40° C. for 5 to 10 minutes.

Next, the experimental tests were proceeding. First, the heat dissipating material was put in a constant temperature bath of 80° C. After the measurement, it was known that it took 145 seconds to heat the heat dissipating material from 30° C. to 80° C. After that, the heat dissipating material was put in a constant temperature bath of 30° C. After the measurement, it was known that it took 198 seconds to cool the heat dissipating material from 80° C. to 30° C. The thermal conductivity coefficient of the heat dissipating material was 2.580 W/m·K. The surface resistivity of the heat dissipating material was $1.60 \times 10^2$ Ω/sq. At last, the heat dissipating material was filled in a battery pack. After the measurement, it was known that the mean temperature of the battery pack containing the heat dissipating material was 49.91° C. after discharging for 15 minutes. It took 358 seconds to heat the pure paraffin wax from 30° C. to 80° C. and 1534 seconds to cool the pure paraffin wax from 80° C. to 30° C. Therefore, the thermal conductive ability of the heat dissipation material was better than that of the pure paraffin wax. The mean temperature of the battery pack without the heat dissipating material was 61.40° C. after discharging for 15 minutes. Accordingly, the working temperature of the battery pack filled with the heat dissipating material was indeed lower.

Embodiment 8

The present embodiment was similar to Embodiment 7, except that the content of the paraffin wax was 60% by weight, based on the total weight of the heat dissipating material; the content of boron nitride was 30% by weight, based on the total weight of the heat dissipating material; and the content of the graphite was 10% by weight, based on the total weight of the heat dissipating material. It took 148 seconds to heat the heat dissipating material of the present embodiment from 30° C. to 80° C. and 206 seconds to cool the heat dissipating material of the present embodiment from 80° C. to 30° C. The thermal conductivity coefficient of the heat dissipating material was 2.424 W/m·K. The surface resistivity of the heat dissipating material was $1.76 \times 10^2$ Ω/sq. The mean temperature of the battery pack containing the heat dissipating material was 50.06° C. after discharging for 15 minutes.

Embodiment 9

The present embodiment was similar to Embodiment 7, except that the content of the paraffin wax was 60% by weight, based on the total weight of the heat dissipating material; the content of boron nitride was 35% by weight, based on the total weight of the heat dissipating material; and the content of the graphite was 5% by weight, based on the total weight of the heat dissipating material. It took 250 seconds to heat the heat dissipating material of the present embodiment from 30° C. to 80° C. and 867 seconds to cool the heat dissipating material of the present embodiment from 80° C. to 30° C. The thermal conductivity coefficient of the heat dissipating material was 1.455 W/m·K. The surface resistivity of the heat dissipating material was $1.44 \times 10^{12}$ Ω/sq. The mean temperature of the battery pack containing the heat dissipating material was 51.03° C. after discharging for 15 minutes.

Embodiment 10

The present embodiment was similar to Embodiment 7, except that the content of the paraffin wax was 50% by weight, based on the total weight of the heat dissipating material; the content of boron nitride was 45% by weight, based on the total weight of the heat dissipating material; and the content of the graphite was 5% by weight, based on the total weight of the heat dissipating material. It took 176 seconds to heat the heat dissipating material of the present embodiment from 30° C. to 80° C. and 301 seconds to cool the heat dissipating material of the present embodiment from 80° C to 30° C. The thermal conductivity coefficient of the heat dissipating material was 2.126 W/m·K. The surface resistivity of the heat dissipating material was 2.94×10$^{12}$ Ω/sq. The mean temperature of the battery pack containing the heat dissipating material was 50.36° C. after discharging for 15 minutes.

Embodiment 11

The present embodiment was similar to Embodiment 7, except that the content of the paraffin wax was 50% by weight, based on the total weight of the heat dissipating material; the content of boron nitride was 40% by weight, based on the total weight of the heat dissipating material; and the content of the graphite was 10% by weight, based on the total weight of the heat dissipating material. It took 142 seconds to heat the heat dissipating material of the present embodiment from 30° C. to 80° C. and 192 seconds to cool the heat dissipating material of the present embodiment from 80° C to 30° C. The thermal conductivity coefficient of the heat dissipating material was 2.818 W/m·K. The surface resistivity of the heat dissipating material was 3.05×10$^{11}$ Ω/sq. The mean temperature of the battery pack containing the heat dissipating material was 49.67° C. after discharging for 15 minutes.

Embodiment 12

The present embodiment was similar to Embodiment 7, except that the content of the paraffin wax was 50% by weight, based on the total weight of the heat dissipating material; the content of boron nitride was 35% by weight, based on the total weight of the heat dissipating material; and the content of the graphite was 15% by weight, based on the total weight of the heat dissipating material. It took 132 seconds to heat the heat dissipating material of the present embodiment from 30° C. to 80° C. and 188 seconds to cool the heat dissipating material of the present embodiment from 80° C. to 30° C. The thermal conductivity coefficient of the heat dissipating material was 3.510 W/m·K. The surface resistivity of the heat dissipating material was 3.56×10$^4$ Ω/sq. The mean temperature of the battery pack containing the heat dissipating material was 48.98° C. after discharging for 15 minutes.

TABLE 4

| Embodiments | Paraffin wax (%) | Boron nitride (%) | Graphite (%) |
|---|---|---|---|
| 7 | 60 | 25 | 15 |
| 8 | 60 | 30 | 10 |
| 9 | 60 | 35 | 5 |
| 10 | 50 | 45 | 5 |
| 11 | 50 | 40 | 10 |
| 12 | 50 | 35 | 15 |

TABLE 5

| Embodiments | Heating time required (sec.) | Cooling time required (sec.) | Thermal conductivity coefficient (W/m·K) | Surface resistivity (Ω/sq) | Temperature after discharging (° C.) |
|---|---|---|---|---|---|
| 7 | 145 | 198 | 2.580 | 1.60 × 10$^2$ | 49.91 |
| 8 | 148 | 206 | 2.424 | 1.76 × 10$^2$ | 50.06 |
| 9 | 250 | 867 | 1.455 | 1.44 × 10$^{12}$ | 51.03 |
| 10 | 176 | 301 | 2.126 | 2.94 × 10$^{12}$ | 50.36 |
| 11 | 142 | 192 | 2.818 | 3.05 × 10$^{11}$ | 49.67 |
| 12 | 132 | 188 | 3.510 | 3.56 × 10$^4$ | 48.98 |

To summarize the above, the heat dissipating material provided in the embodiments of the present invention had higher thermal conductivity and higher surface resistivity. The thermal energy generated by the battery pack containing the heat dissipating material during the charging or discharging was absorbed by the heat dissipating material, thereby lowering the temperature of the battery pack during the charging or discharging, and simultaneously maintaining good electrical performance of the battery pack.

Although the present invention has been disclosed above with preferred embodiments, these preferred embodiments do not intend to limit the scope of the present invention. It will be recognized by those skilled in the art that various changes and modifications may be made without departing from the spirit and scope of the present invention.

What is claimed is:

1. A heat dissipating material, comprising:
   50 to 60% by weight of paraffin wax;
   20 to 40% by weight of boron nitride;
   3 to 15% by weight of graphite; and
   1 to 5% by weight of a modified multi-walled carbon nanotube with a surface ester group (—COOR);
   wherein the paraffin wax absorbs or releases heat through phase change, and the boron nitride and the graphite increase the thermal conductivity of the heat dissipating material, and
   wherein the modified multi-walled carbon nanotube is a octadecanol-modified multi-walled carbon nanotube (CNT-C18).

2. The heat dissipating material of claim 1, wherein the thermal conductivity coefficient of the heat dissipating material is from 1.457 W/m·K to 5.598 W/m·K.

3. The heat dissipating material of claim 1, wherein the surface resistivity of the heat dissipating material is from 1.20×10$^4$ Ω/sq to 3.30×10$^8$ Ω/sq.

4. A method for preparing the heat dissipating material of claim 1, comprising:
   providing the paraffin wax, the boron nitride, the graphite, and the modified multi-walled carbon nanotube of claim 1;
   heating the paraffin wax until the paraffin wax is softened; and
   mixing the boron nitride, the graphite, the modified multi-walled carbon nanotube, and the paraffin wax.

5. The method for preparing a heat dissipating material of claim 4, wherein the ambient temperature is from 30° C. to 40° C. as mixing the boron nitride, the graphite, the modified multi-walled carbon nanotube, and the paraffin wax.

6. The method for preparing a heat dissipating material of claim 4 further comprising a stirring action with a stirring rate of 50 to 80 turns/min. as mixing the boron nitride, the graphite, the modified multi-walled carbon nanotube, and the paraffin wax.

7. The method for preparing a heat dissipating material of claim 6, wherein the stirring action is carried out for 5 to 10 minutes.

8. The method for preparing a heat dissipating material of claim 4 further comprising a method for preparing the modified multi-walled carbon nanotube, which comprises:
   acidifying a multi-walled carbon nanotube for obtaining a multi-walled carbon nanotube with a surface carboxylic acid functional group (—COOH); and
   adding a long chain alkanol and a dehydrating agent for dehydrating to form an ester bonding between the multi-walled carbon nanotube and the long chain alkanol and thus obtaining the modified multi-walled carbon nanotube.

9. The method for preparing a heat dissipating material of claim 8, wherein the long chain alkanol is a octadecanol.

10. The method for preparing a heat dissipating material of claim 8, wherein the acidifying is carried out by an oxidative strong acid.

11. The method for preparing a heat dissipating material of claim 10, wherein the oxidative strong acid is a mixed acid solution consisting of sulfuric acid ($H_2SO_4$) and nitric acid ($HNO_3$) with a volumetric ratio of $H_2SO_4/HNO_3=3/1$.

\* \* \* \* \*